United States Patent [19]

Michel

[11] Patent Number: 5,270,814
[45] Date of Patent: Dec. 14, 1993

[54] METHOD AND APPARATUS FOR MEASURING THE LINEARITY OF A TRANSMISSION SYSTEM BY DETECTING THE STRENGTH OF AN INTERCARRIER FREQUENCY

[75] Inventor: Jean Michel, Trappes, France

[73] Assignee: Thomson-Lgt Laboratoire General des Telecommunications, Conflans Sainte Honorine, France

[21] Appl. No.: 768,761
[22] PCT Filed: Jan. 25, 1991
[86] PCT No.: PCT/FR91/00042
 § 371 Date: Oct. 15, 1991
 § 102(e) Date: Oct. 15, 1991
[87] PCT Pub. No.: WO91/12697
 PCT Pub. Date: Aug. 22, 1991

[30] Foreign Application Priority Data
Feb. 13, 1990 [FR] France .................. 90 01669

[51] Int. Cl.$^5$ ........................... H04N 17/00
[52] U.S. Cl. ..................... 358/139; 358/197; 358/35; 370/76
[58] Field of Search ............ 358/35, 139, 197; 370/76

[56] References Cited
U.S. PATENT DOCUMENTS

| | | | |
|---|---|---|---|
| 4,145,706 | 3/1979 | Hess | 358/139 |
| 4,490,743 | 12/1984 | Mycyrek et al. | 358/197 |
| 4,513,323 | 4/1985 | Patel | 358/197 |
| 4,528,592 | 7/1985 | Apeldoorn | 358/197 |
| 4,682,119 | 7/1987 | Michel | 358/35 |

FOREIGN PATENT DOCUMENTS
0210007 1/1987 European Pat. Off. .

OTHER PUBLICATIONS

IEEE Transactions on Broadcasting, vol. 34, No. 3, Sep. 1988, IEEE, (New York, US), A. D. Broadhurst et al.: "Measuring television transposer intermodulation distortion", pp. 344–355.
Funkschau, vol. 62, No. 1, 29 dec. 1989, (Munich, DE), C. Busel: "FET in der Sendermesstechnik", pp. 56–59.
Funkschau, vol. 59, No. 16, 31 Jul. 1987, (Munich, DE), G. Ebersberger: "Periodisch messen Wobbelmesstechnik: Anwendung in der Praxis", pp. 51–54.

Primary Examiner—Richard Hjerpe
Assistant Examiner—Minsun Oh
Attorney, Agent, or Firm—Oblon, Spivak, McClelland, Maier & Neustadt

[57] ABSTRACT

A method and apparatus for measuring and correcting nonlinearities in a transmission system which transmits a modulated wave having a maximum peak level $N_C$ and with a frequency band $[F_1, F_2]$. The system transmits a composite signal having a carrier frequency proximate to one end of the frequency band, modulated by a low frequency signal having a level varying between zero and the peak level $N_C$. The composite signal also has two other signals with carrier frequencies proximate to the other end of the band and having frequencies differing by an intercarrier frequency. The composite transmitted signal is received and analyzed for the presence of a signal at the intercarrier frequency which varies in amplitude with the nonlinearity of the system. Linearity of the system is obtained when the signal at the intercarrier frequency is zero or less than a predetermined value. The nonlinearity measurement only requires the measurement of the intercarrier frequency and the nonlinearity measurement can be properly performed regardless of the level of the transmitted signal in the space $[0, |N_C|]$.

2 Claims, 6 Drawing Sheets

RF MODULATED BY THE LONE VIDEO SIGNAL

RF MODULATED BY THE COMPOSITE VIDEO+SOUND SIGNAL

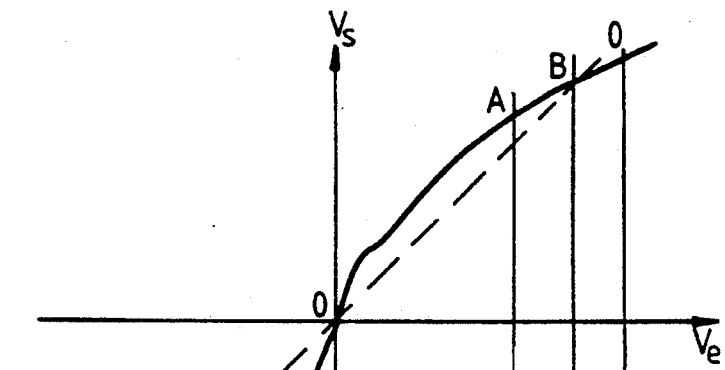
FIG.2a
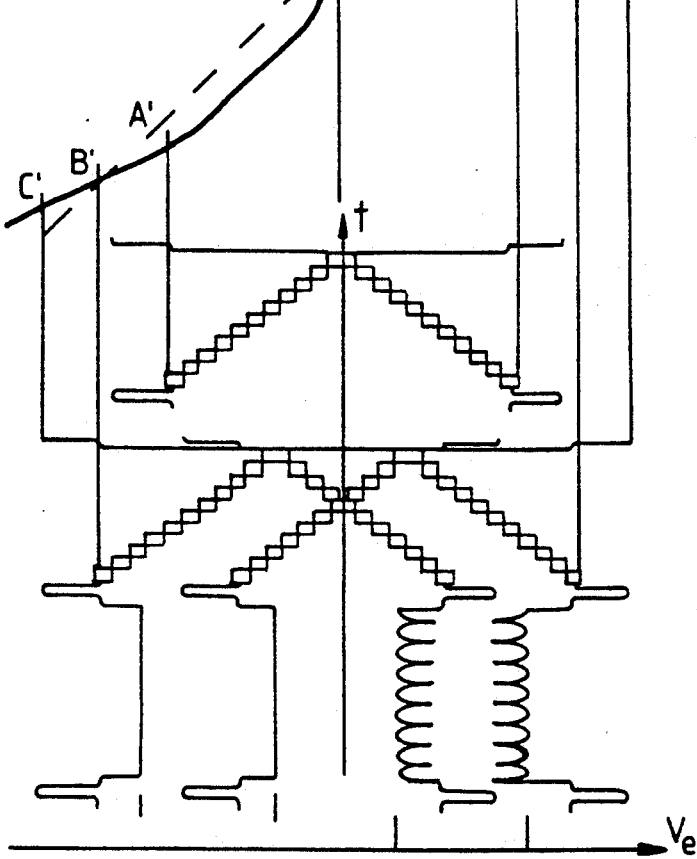
FIG.2b
FIG.2c
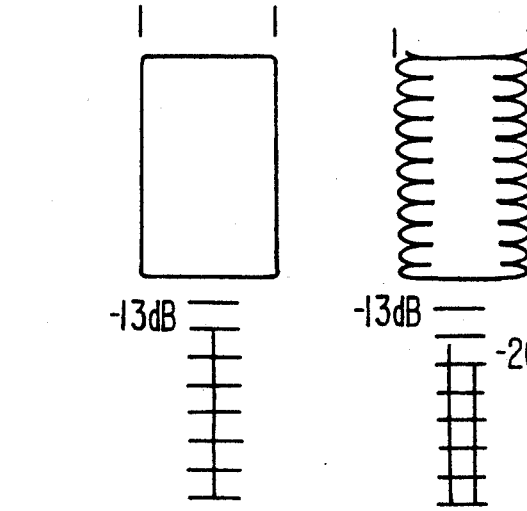
FIG.2d
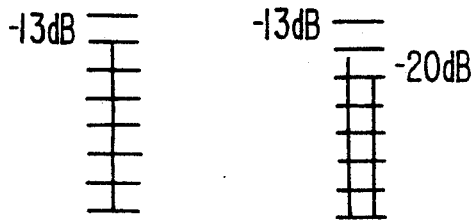

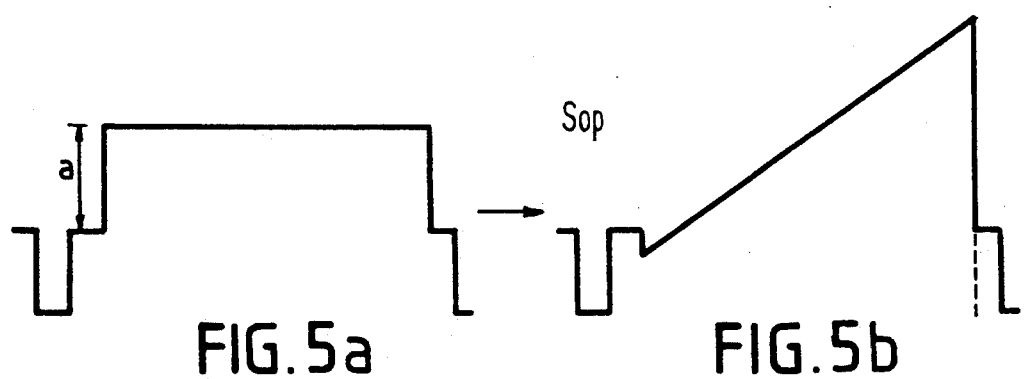
FIG.5a  FIG.5b
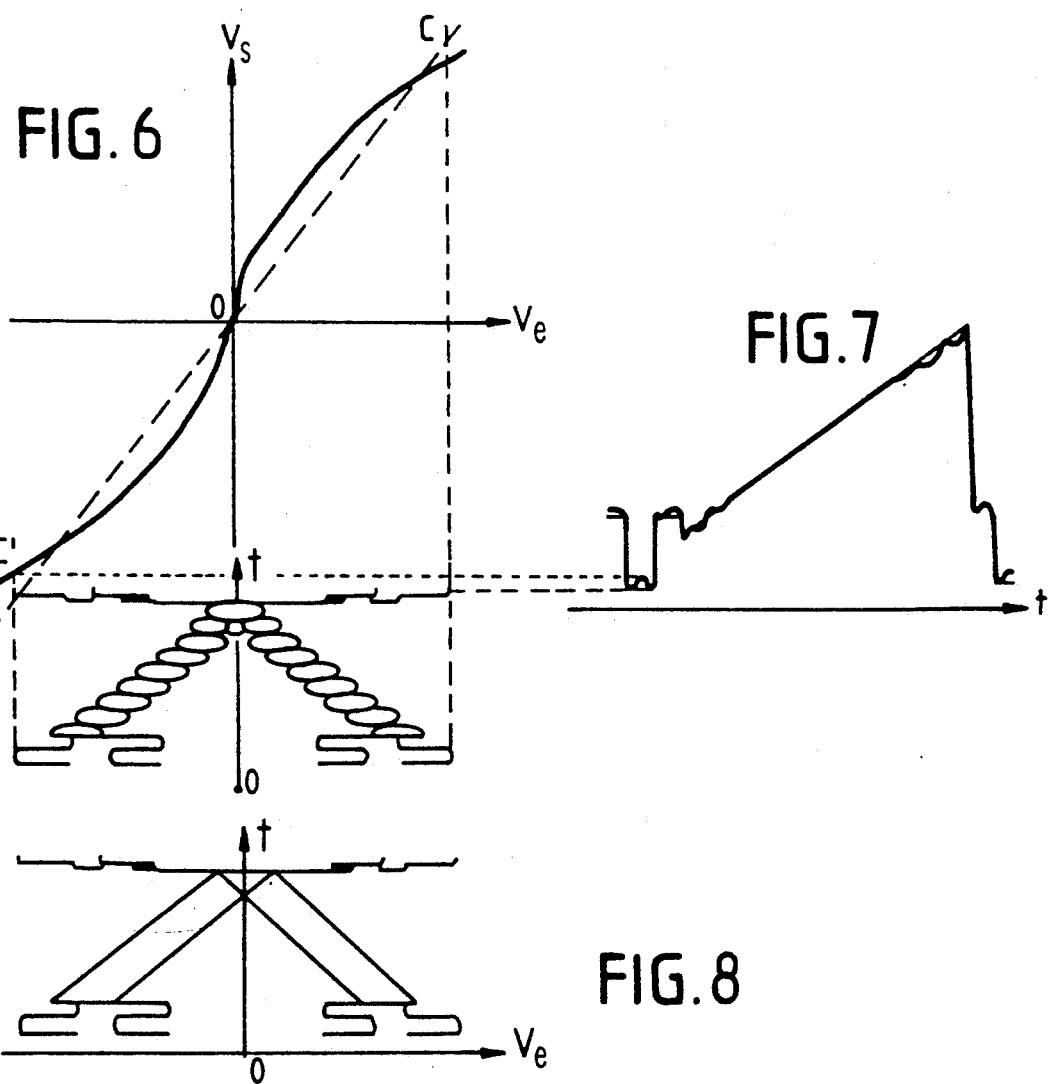
FIG.6
FIG.7
FIG.8

METHOD AND APPARATUS FOR MEASURING THE LINEARITY OF A TRANSMISSION SYSTEM BY DETECTING THE STRENGTH OF AN INTERCARRIER FREQUENCY

BACKGROUND OF THE INVENTION

1. Field of the Invention

The invention generally relates to systems for transmitting modulated signals, and in particular to the transmitting of television signals. The invention also relates to a single measurement method, and device, for displaying and rating the linearity of a transmission system.

2. Discussion of the Background

An information-carrying signal may be regarded as an amplitude-modulated carrier frequency or as a sum of n spectral components ($n \geq 2$) brought together in one channel. Such a signal is characterized by two dimensions:

Its spectral breadth, that is to say the interval between the extreme frequencies $F_1$, $F_2$ or angular frequencies $\omega_1$, $\omega_2$ of the spectrum: this dimension is written $[F_1, F_2]$ or $[\omega_1, \omega_2]$.

Its peak level, $N_c$. Periodically all the spectral components reach their maximum amplitude; at the same instant the signal reaches its peak level. This second dimension of the signal is written $[-N_c, +N_c]$ or $[0, |N|]$. The signal to be transmitted is thus defined by these two dimensions.

Respect for the integrity of this signal, that is to say respect for the information which it contains, is bound by the following condition: the transfer characteristic of the transmission system, that is to say the function $f$ connecting the output voltage $V_s$ with the input voltage $V_e$, $V_s = f(V_e)$, in the space $\{[\omega_1, \omega_2][0, |N_c|]\}$, that is to say as a function of the angular frequency parameter $\omega$ and of the level parameter N, must be linear. The derivative of this characteristic, that is to say the transfer function, must be capable of being written: $\tau = \rho_{(\omega)} e^{j\phi(\omega)}$, $\rho_{(\omega)}$ and $\phi_{(\omega)}$ being the modulus and the phase respectively of the transfer function, with $\rho_{(\omega)}$ = constant and $\phi_{(\omega)} = K\omega + \phi_0$; that is to say the transfer function depends only on the frequency and not on the level of the signal.

This is the expression for the transfer function of a linear network. It is then possible to apply the superposition theorem which characterizes the simultaneous transmission of several signals in one channel without these various signals interacting.

However, in an arbitrary transmission system, the modulus and the phase of the transfer function are not dependent solely on the angular frequency $\omega$, but are also dependent on the level N of the signal. In this case, the transfer function can only be written in the form $$\tau_{(\omega,N)} = \rho_{(\omega,N)} \cdot f[\phi\omega_{(\omega,N)}].$$

It will only be possible to get back to the previous notation when:

$$d\tau_{(\omega,N)}/dN = 0,$$

that is to say when simultaneously $$\left[\begin{matrix} d\rho_{(\omega,N)}/dN = 0 \\ d\phi_{(\omega,N)}/dN = 0 \end{matrix}\right] \begin{matrix} \omega_2 \\ \omega_1 \end{matrix} \bigg| \begin{matrix} |N_c| \\ 0 \end{matrix}$$

This is the linearity condition.

The problem is the checking of this linearity condition through a simple test procedure, then from the observed defects in linearity located on the transfer characteristic $V_s = f(V_e)$, their correcting.

According to the prior art, in the field of television transmission, the use of a test signal, composed of ten luminance levels with a signal of frequency 4.43 MHz or 3.58 MHz (chrominance subcarrier) superimposed on each of these levels, allows the linearity conditions to be checked at two points of the frequency spectrum, $\omega_p$ near the picture carrier frequency, and $\omega_c$ near the chrominance carrier frequency. With the aid of appropriate filters, it is known to display the linearity and the differential gain in the video frequency band, termed the "LF Linearity", and "Differential Gain" and to compare the variation in these parameters between the input of the transmitter or of the retransmitter and the output by way of the demodulator or receiver. The wave modulated by this test signal is the input signal $V_e$ for the transmission system which delivers the wave $V_s$ at its output, the transfer characteristic being the curve $V_s = f(V_e)$. The use of a synchronous demodulator allows the phase of the carrier to be displayed as a function of the level, a parameter termed the "Incoming Phase". A "vectorscope" allows the variation in the phase of the color subcarrier to be tracked as a function of the level: this measurement is the "Differential Phase" measurement.

As indicated above these four measurements "LF Linearity", "Differential Gain", "Incoming Phase" and "Differential Phase" are therefore measurements through sampling for two frequencies characteristic of the spectrum to be transmitted $\omega_p$ and $\omega_c$. If these four parameters are utilized for what they are, that is to say samples, and if they have not been the subject of special processing operations, it is possible to deduce therefrom by interpolation and extrapolation the linearity from $\omega_1$ to $\omega_2$, that is to say throughout the spectrum of the signal.

These measurements can be confirmed and refined, in the case of a single channel sound and picture transmission, when one or two sound channels are added to the modulated picture signal. The nonlinearity in the transfer characteristic causes the appearance of beat products picked up on reception as recurrent noises:
intermodulation
cross modulation
phase noise.

The monitoring of the quality, the adjusting and the maintaining of an amplifying system are therefore, conventionally, complicated operations which require a large number of measuring instruments).

SUMMARY OF THE INVENTION

The subject of the invention is a method, and the corresponding single measurement device for displaying and rating the linearity of a transmission system, which is simpler and better adapted to a complete correction of the nonlinearities throughout the spectrum of the signal than the measuring and correcting systems according to the prior art.

According to the invention, the single measurement method for displaying and rating the linearity of a signal transmission system with maximum peak level $N_c$ and with maximum frequency band $[F_1, F_2]$, is characterized in that it consists of transmitting within the transmission system a composite signal comprising a first carrier frequency, neighboring one of the ends of the band, modulated by a low-frequency operator signal with level varying between 0 and the maximum peak level to be transmitted by the system, and two other carrier frequencies neighboring the other end of the band and distanced from one another by a value termed the intercarrier frequency such that, after amplification and demodulation, this intercarrier frequency, when it appears in the spectrum owing to nonlinearities, can be separated from the other components of the composite signal. The measuring properly speaking of the defects consisting of filtering this component at the interconsisting carrier frequency and in analyzing the variation in its amplitude as a function of the level of the operator signal, the correcting of the defects consisting of reducing this component to an amplitude lower than a predetermined amplitude.

The device intended for implementing this method is characterized in that it comprises a demodulator connected to a bandpass filter tuned to the intercarrier frequency and analysis means connected to the output of the filter for detecting the variation in the amplitude of the signal at the intercarrier frequency as a function of that of the low-frequency operator signal.

BRIEF DESCRIPTION OF THE DRAWINGS

The invention will be better understood and other characteristics will emerge with the aid of the description which follows with reference to the attached figures.

FIGS. 2a, 2b, 2c and 2d illustrate respectively the transfer characteristic, a lone picture signal $V_e$, the displacing of a composite signal ahead of this characteristic for a lone sound carrier and for two sound carriers;

FIGS. 5a and 5b respectively illustrate two luminance signals with constant level and with increasing level, over an picture period;

FIG. 6 illustrates the excursion of a composite signal consisting of one picture carrier modulated by an increasing signal and of two sound carriers, synchronous with the line frequency;

FIG. 7 illustrates the demodulated signal $V_s$ after transmission of the composite signal represented in FIG. 6;

FIG. 8 illustrates the envelope of the excursion of a composite signal consisting of one picture carrier modulated by an increasing signal and of two sound carriers at least one of which is not synchronous with the signal at the line frequency;

DESCRIPTION OF THE PREFERRED EMBODIMENTS

According to the invention, the measurement of defects due to the nonlinearities in a transmission system is allied to that carried out in the case of a lone picture channel amplification. In fact, in a single picture and sound channel, everything happens as if the signal were displaced ahead of the transfer characteristic in a sinusoidal motion at the pace of the sound frequency, as explained below.

Figure 1A:
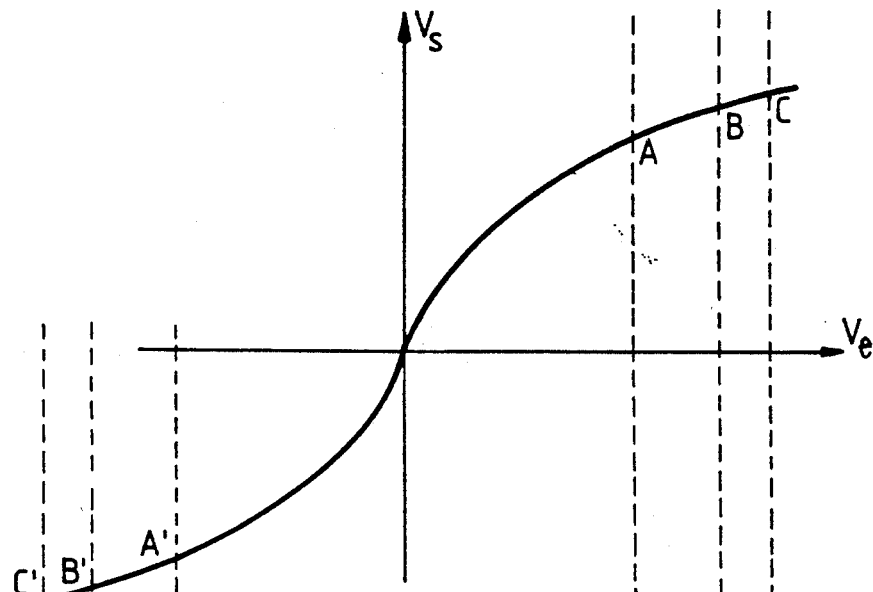
FIGS. 1a, 1b and 1c illustrate respectively the transfer characteristic $V_s = f(V_e)$, a picture signal $V_e$ alone, and a composite picture and sound signal in the extreme positions.
Figure 1B:
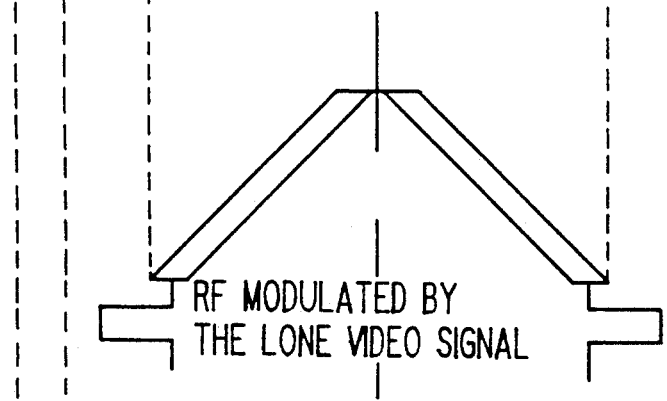
Figure 1C:
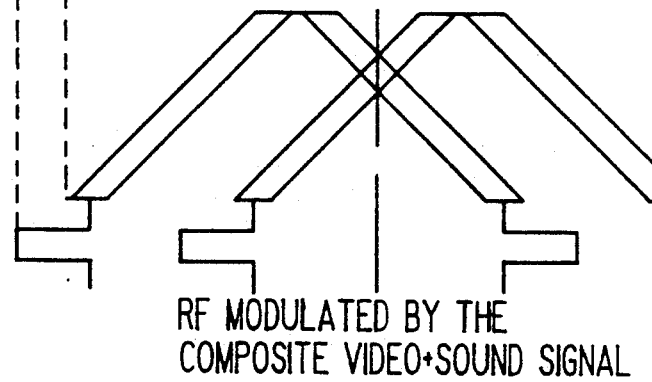

FIG. 1a illustrates the transfer characteristic $V_s = f(V_e)$, FIG. 1b illustrates the input signal $V_e$ modulated by the picture signal alone assumed to be a luminance ramp, and FIG. 1c illustrates the extreme positions occupied by the input signal $V_e$ relative to the characteristic, in the course of its displacement due to the sound signal.

The derivative of the transfer characteristic $V_s = f(V_e)$ of the picture signal varies at the pace of the sound frequency, and this is the origin of the intermodulation. If the characteristic were perfectly linear throughout its excursion, (segment C'C), there would be no intermodulation, the picture signal sliding smoothly along the segment C'C. The linearity condition would therefore be satisfied, at least if this single defect were apparent. But in fact, the characteristic $V_s = f(V_e)$ and more particularly its slope, expresses only the modulus of the transfer function. It is also necessary to consider the phase of this transfer characteristic which may also, as indicated above, vary with the level. This phase is difficult to represent on an analog diagram, but the fact that it varies with the nonlinearity must be taken into account.

In FIG. 1, as in the analogous figures following, the drawings of a modulated wave show only the envelope of the signal.

FIGS. 2a and 2b are analogous to FIGS. 1a and 1b, but the video signal is assumed to consist of 10 successive levels of luminance. In contrast, FIG. 2c which represents the maximum excursion of the video signal relative to the transfer characteristic owing to the displacement due to a sound carrier on the left part of the figure and owing to the displacement due to two sound carriers on the right part of the figure. The latter drawing represents the envelope of the signal equivalent to two carriers, one being a modulating spectral line for the other. The frequency of the envelope signal is equal to the difference in the frequencies of the two sound carriers. In this FIG. 2c, an additional line appears in the drawing of the wave modulated as a function of time. The input signal comprises a luminance signal consisting of a continuous grey level, which level can be varied from black to white.

The modulated picture signal corresponding to this line suffers the same displacement as the other line in the presence of sound. This displacement due to sound is easier to draw on the time space corresponding to the luminance. Although a modulated wave is always symmetric, the drawing represents this displacement on the left figure for a single sound carrier at −10 dB relative to the picture carrier, and on the right part for two sound carriers, one at −13 dB and the other at −20 dB, the peak-to-peak amplitude being the same in the two cases. There thus appears a low-frequency component of the movement which displaces the picture signal ahead of the characteristic, this is the intercarrier frequency, that is to say the difference in the two sound frequencies, which is here taken as 156.25 kHz (10 times the line frequency) for convenience in the drawing. This low-frequency component exists throughout the entire line (even if, in order to keep the drawing clearly readable, it is not drawn over the interval of time corresponding to the synchronizing signal and to the blanking porches).

If the portion CC' of the characteristic is perfectly linearized, the sliding of the picture signal brings no defect to this picture signal.

Figure 3:
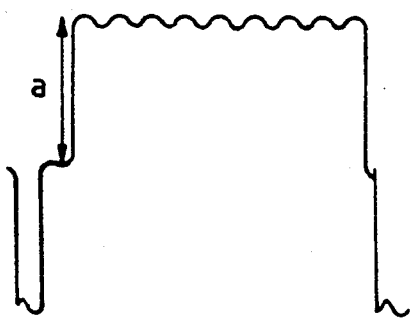
FIG. 3 illustrates the corresponding demodulated output signal $V_s$.

By contrast, if the slope of the characteristic exhibits variations in certain regions, a small signal with the same frequency (156.25 kHz) which accounts for the variation in the slope of the characteristic, and therefore in the value of the second derivative of the transfer characteristic at the points (or in the region) under consideration, appears superimposed on the input signal. If the sound carriers are synchronized with the line frequency, a superimposed signal with the shape shown in FIG. 3 can be observed on the demodulated video frequency signal.

On varying the amplitude a, the amplitude of the superimposed signal varies. This signal is the result of a cross modulation phenomenon: the amplitude modulation of the sound signal also modulates the picture signal.

The useful component in this measurement is the 156.25 kHz modulating component for the movement which displaces the picture signal ahead of the characteristic. It is therefore advisable to promote it in order to reveal the linearity defects. FIG. 2 represented the modulated signal in its peak displacement created by the presence of two sound carriers with levels −13 dB and −20 dB relative to the picture level at the synchronizing peak.

Figure 4:
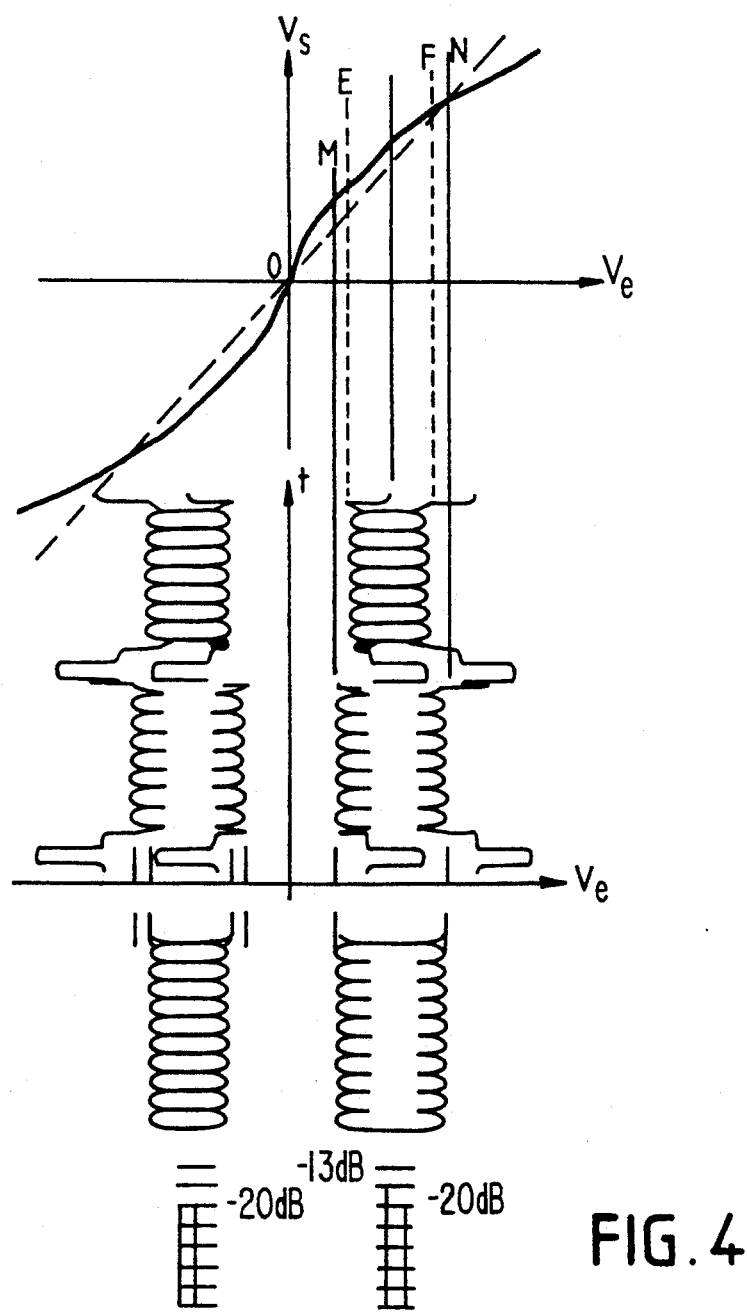
FIG. 4 illustrates the excursion of a composite signal consisting of one picture carrier and of two sound carriers relative to the transfer characteristic.

FIG. 4 represents a similar picture signal showing the movement (or rather the low-frequency envelope of this movement) in the luminance part of the input signal as a function of time, in the right part for two sound carriers at −13 dB and −20 dB, in the presence of two equal sound carriers at −20 dB relative to the video picture signal. In the latter case the low-frequency component of the movement occupies all of what may be called the "displacement" space.

The signal with frequency 156.25 kHz, gathered after reception or demodulation, accounts for the possible nonlinearity in the part EF of the characteristic in a continuous fashion, whereas in the other case, it was the nonlinearity of the part MN, and in discontinuous fashion.

The waves in the previous figures are modulated on the basis of a signal comprising a constant luminance level over the whole line. To account for all the possible defects, this level must moreover vary within the whole luminance range in order to test the transfer characteristic in its near entirety.

To automate this variation in level, it suffices to substitute a sawtooth signal as shown in FIG. 5b and called the operator signal $S_{op}$ in what follows, for the constant luminance signal described above and shown in FIG. 5a.

The modulated picture signal $V_e$ resulting therefrom is shown as a function of time in FIG. 6 at the same time as the transfer characteristic, the sound carriers being synchronous. In this figure, as in FIG. 4, the superposition of the 156.25 kHz signal is not drawn on the synchronizing signal. For good readability of the picture, only the extreme positions occupied by the synchronizing signal are drawn. The signal gathered after demodulation, as shown in FIG. 7, has a component at the 156.25 kHz frequency when the transfer characteristic is not linear which is manifested through finite increments in $V_e$. These finite increments recur over the line frequency and are therefore fixed. They should preferably be random relative to the line frequency, and to achieve this it suffices for one of the sound signals to no longer be synchronous with the line frequency. This case is illustrated by the drawing of the corresponding modulated wave shown in FIG. 8. The component at 156.25 kHz shown up to this time can no longer be so in this case; only the limits of its displacement relative to the transfer characteristic can be shown.

Figure 9:
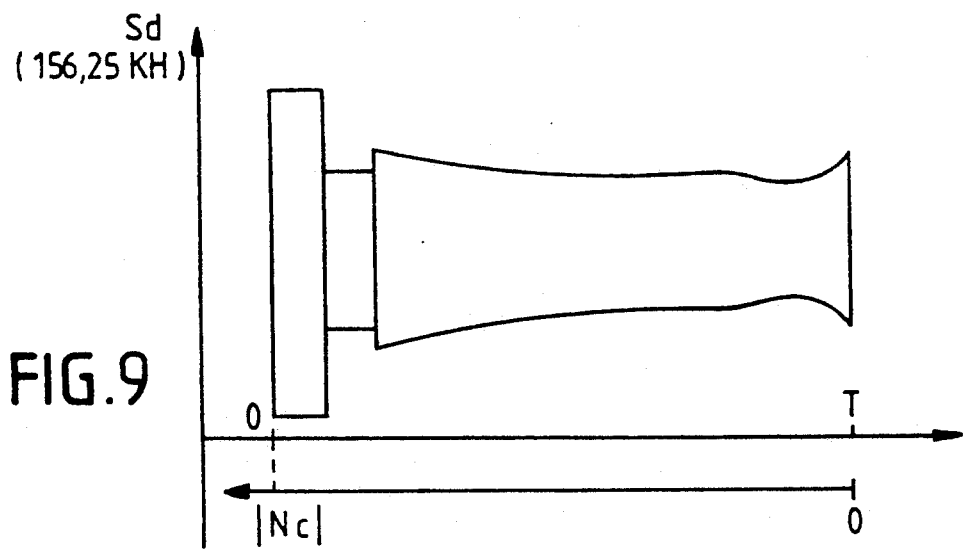
FIG. 9 illustrates the signal $S_d$ detected from the component at the inter-sound frequency.

After demodulation and filtering of the component $S_d$ at the frequency F=156.25 kHz, a measurement of the nonlinearity is obtained in a form shown in FIG. 9. This measurement will be better understood from the block diagram of a common channel transmitter with two sound carriers, represented in FIG. 10.

The transmitter comprises audio stages 10 in which the sound signals are processed, and video stages 20 for processing the picture signal. These signals are applied respectively to intermediate-frequency modulators, 11 and 21, which receive the intermediate frequency picture and sound carriers. An adder 30 brings together the intermediate-frequency picture signal and the two modulated sound carriers; its output is connected to the input of the amplifying system 50 which comprises a so-called complementary amplifier 51 whose characteristic is adjusted to compensate the linearity defects generated during power amplification, a converter 52 carrying the signal at the transmission frequencies by mixing with a transmission frequency $I_T$, and the power-amplifying stages 53.

When the adjusting of the complementary amplifier is not perfect, the inter-sound frequency appears in the picture spectrum. For the measurement, a generator 40 of the operator video signal $S_{op}$ described above is provided, the input of which is coupled to a switchable input of the video stages 20. A coupler 60 allows part of the signal to be sampled at the output of the amplifying system, before transmission, for the measurement system which comprises a demodulator 70, a low-pass filter 80 making it possible to filter and detect the signal at the inter-sound frequency, and an oscilloscope 90 whose timebase is synchronous with the line frequency and which makes it possible to show the variation in level of the component at the inter-sound frequency which characterizes the linearity defects.

The measurement can be summarized as follows:

1) A video frequency operator signal $S_{op}$ emanating, from the generator 40, consisting of a sawtooth and shown at the output of the generator, modulates the picture carrier in such a way as to explore as completely as possible the transfer characteristic $V_s = f(V_e)$ ahead of which the wave thus modulated is placed;

2) The two sound carriers emanating from the modulator 11, and the spectral lines of which are shown at the output of the modulator 11 are superimposed with the picture signal whose spectrum is shown at the output of the modulator 21. These carriers bring about a displacement of the picture signal ahead of the transfer characteristic. This displacement contains a low-frequency component which constitutes a signal for interrogating the linearity of the amplifying system under test, this low-frequency component being equal to the difference in the sound frequencies, and is called the inter-sound frequency ($F_{IS}$).

3) Any variation in the modulus or in the phase of the transfer function as a function of the level brings about the appearance of a component at the frequency $F_{IS}$ on the picture signal. $F_{IS}$ appears as a modulating spectral line in the spectrum of the picture signal.

Figure 11A:
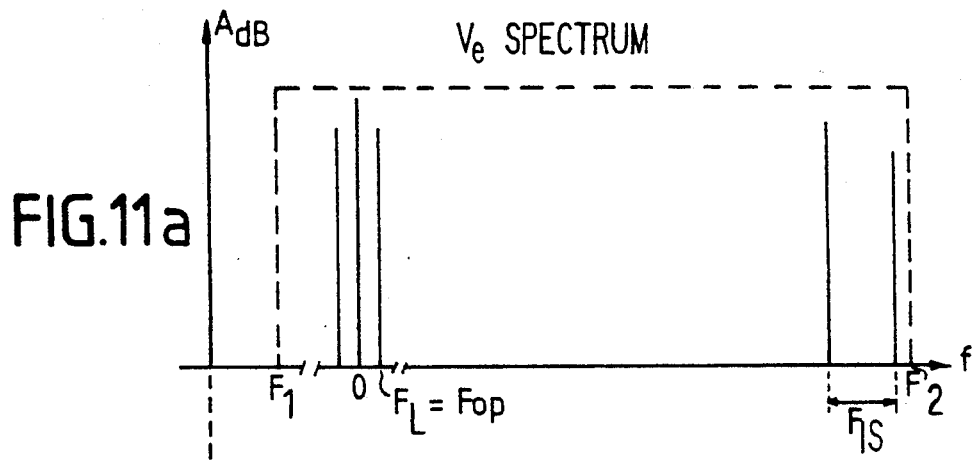
FIGS. 11a and 11b represent respectively the spectrum of the modulated signal $V_e$ before amplification, and the spectrum of the demodulated signal $V_s$ after amplification.
Figure 11B:
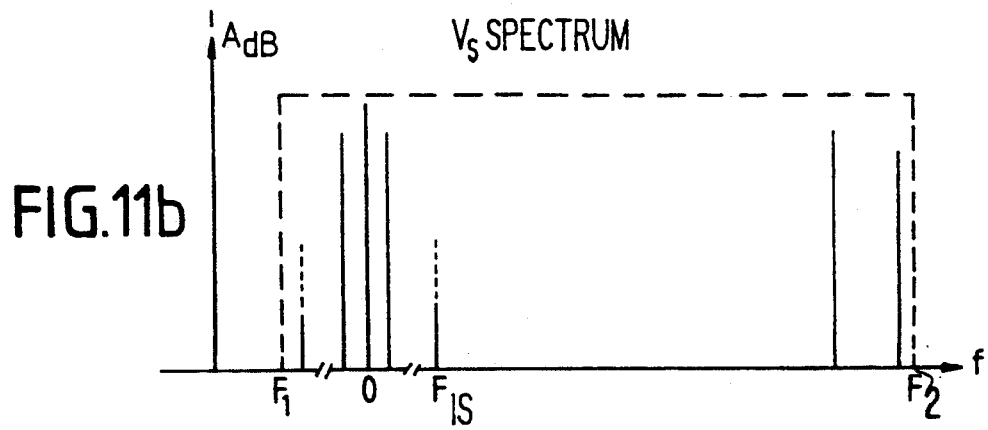
Figure 10:
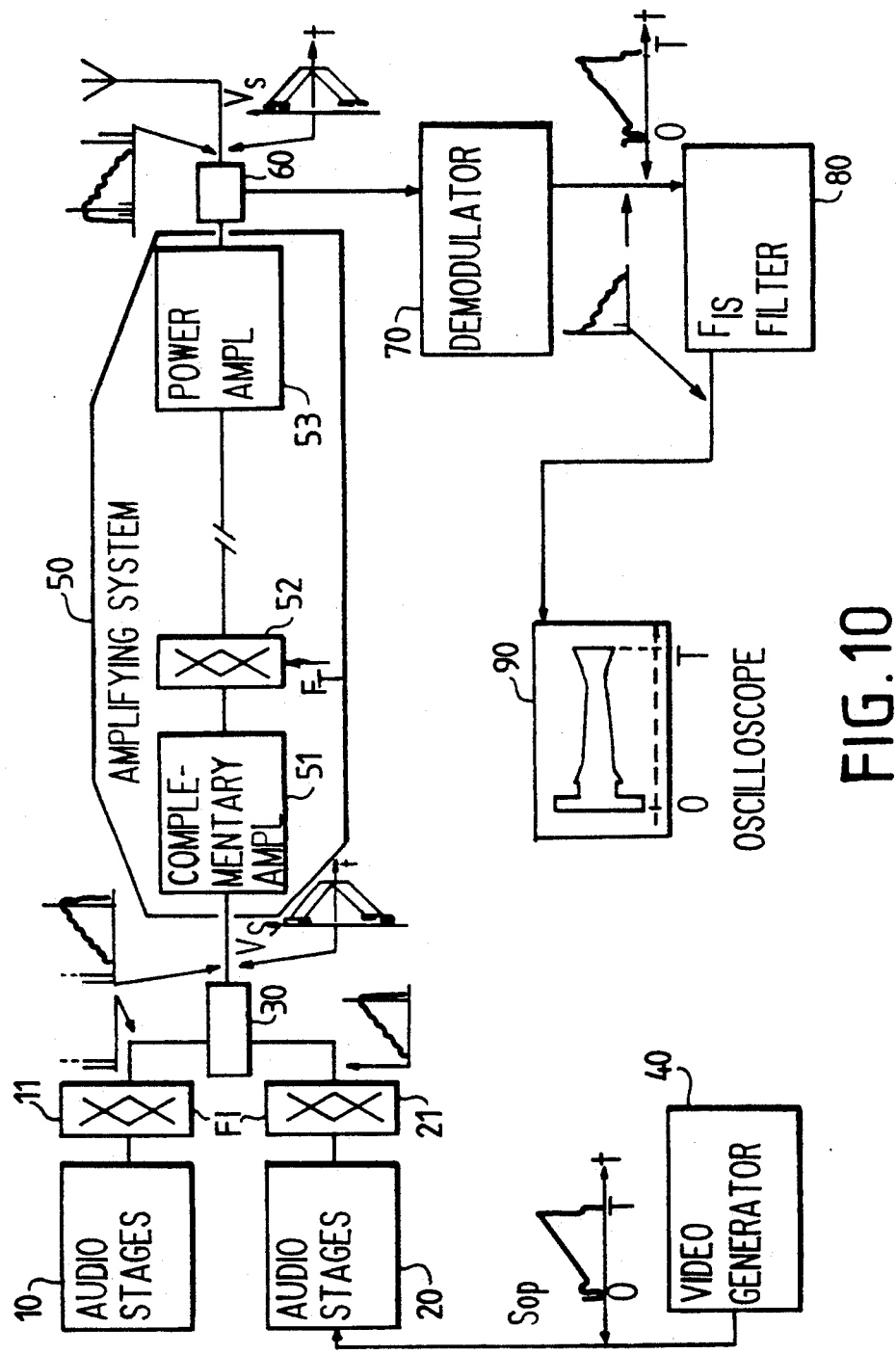
FIG. 10 illustrates a modulated signal transmitter, or retransmitter, and the associated measuring device.

The input $V_e$ and output $V_s$ signals are shown, with the associated frequency spectra, in FIG. 10. These spectra are inverted owing to the change of frequency in the amplifying system and the selecting of the band to be transmitted, but this change is virtually inert as regards the measurement. The FIGS. 11a and 11b show the same spectra on a larger scale and without inversion. The zero of the frequency axis represents the picture carrier frequency. The two sound carriers are picked out through their difference in frequency $F_{IS}$. The frequency axis is expanded near zero so as to be able to represent the line frequency of 156.25 kHz on the same graph, although the sound frequencies are a few MHz.

Strictly speaking it would also be advisable to represent the harmonics of the line frequency $F_L$ (sawtooth signal), but their representation contributes nothing to the understanding of the phenomenon; this signal $F_L$ can take any form whatever, in particular sinusoidal (hence a single spectral line), without changing the principle of the measurement, as described below.

The operator signal is the signal $S_{op}$ at the line frequency $F_L$, shown in FIG. 5b from 0 to T. It generates the modulated wave represented in FIGS. 6 or 8 from 0 to T with the superposition of two sound carriers at −20 dB (in negative modulation mode).

The picture signal is displaced ahead of the segment C'C of the characteristic $V_s=f(V_e)$.

The nonlinearities are represented through the amplitude A of the component at the frequency $F_{IS}$, as a function of time from 0 to T in FIG. 9, and also as a function of the amplitude from $|N_c|$ to 0. Thus the amplitude of $F_{IS}$ represented as a function of time, from [0,T] is also represented relative to a variation in the amplitude of the input signal from 0 to $|N_c|$ in positive modulation mode, or from $|N_c|$ to 0 in negative modulation mode.

A perfect operator signal would have the form of a sawtooth, the start of which would be at the lowest level, namely from the bottom of the synchronizing signal; in fact the discontinuities in the neighborhood of the synchronizing signal and of the blanking porch are easy to interpret in the signal $F_{IS}$ with the result that these small imperfections have no serious consequences. This is why the start of the sawtooth of the operator signal has been chosen at the low level of the luminance.

The signal of frequency $F_{IS}$ in the spectrum of the output signal $V_s$ represents the nonlinearity. Its amplitude changes with the instantaneous level of the modulated carrier; for this reason it is represented partly with a dotted line. The sound carriers may both be at −20 dB, or one at −20 dB and the other at −13 dB, as represented in the figure, without this modifying the method of measurement.

For this measurement, it therefore suffices to gather the signal $F_{IS}$ by demodulation and filtering and to observe this signal on an oscilloscope whose timebase is synchronous with the frequency $F_L$. The operator signal at the frequency $F_L$ allows a correspondence between an amplitude/time space and an amplitude/amplitude space.

The signal $F_{IS}$ represented in FIG. 9 may appear to not exactly represent the linearity defects which might be deduced from the graph $V_s=f(V_e)$; the variations in slope of $V_s=f(V_e)$ represent only the variations as a function of the level of the modulus of the transfer function, whereas the signal at the frequency $F_{IS}$, represented in FIG. 9, represents the sum of the variations in the modulus and in the phase of this transfer function.

In any case, the correcting of the defects consists in cancelling out the signal $S_d$ at the frequency $F_{IS}$, that is to say in reducing it to a single horizontal line on an oscilloscope. In fact, it will only be possible to obtain this result when the modulus and the phase of the transfer function are constant whatever the level N included between 0 and $|N_c|$.

The representation of $F_{IS}=f(N)$ makes it possible to provide for and share out the action of the corrector circuits as a function of the level of the input signal.

The measurement is described above in the context of a "dual-sound" transmitter, that is to say intended for transmitting one picture carrier and two sound carriers for television. The principle is the same for any television transmission, whatever the organization thereof. Moreover, the invention is not limited to television transmission.

Thus in the case of the amplification of the picture alone, that is to say with picture and sound amplification in separate channels, it is possible to add two small signals, with frequencies similar to two sound frequencies, to the picture signal by means of couplers. These signals are summed at the input of the amplifying system, and it then suffices to adjust the levels in such a way that the peak level $N_c$ is the same in normal operation as in the context of the measurement.

In the case of a common system with two sound carriers, and which is separate from the picture amplifying system, there is no longer available the operator signal at the line frequency, modulated by a (picture) sawtooth; this configuration is also one most generally encountered with regard to a modulated wave amplification.

The signal to be amplified has a peak level $N_c$ and a spectral breadth [$F_1$, $F_2$]. The measurement is then performed as follows:

a frequency of the spectrum close to one end that is to say close to $F_1$ or $F_2$ is chosen. This carrier frequency is modulated by a sinusoidal operator signal of low frequency $S_{op}$ and of peak level $N_c$, by analogy with the modulating of the picture carrier in television by the sawtooth signal at the line frequency, in order to explore the whole characteristic $V_s=f(V_e)$.

The signal for interrogating the linearity consists of two low-amplitude signals located at the other end of the spectrum to be transmitted. Their frequency difference, by analogy with the difference $F_{IS}$ in the sound frequencies in television, is such that the signal at this frequency is readily filtered after demodulation. The resulting signal $S_d$ is displayed on an oscilloscope whose timebase is synchronous with the operator signal $S_{op}$. The spectra of the input $V_e$ and output $V_s$ signals are the ones shown in FIGS. 11a and 11b.

As indicated above, in these diagrams the signals are characterized by two dimensions:
their spectral breadth $F_1$, $F_2$,
their peak level, $N_c$.

When the system is linearized, that is to say when the signal $S_d$ is cancelled out at the output, the two dimensions of the measurement signal are also those which define the acceptability of the transmission system.

The measurement as described above by itself enables the derivative of the transfer function to be displayed in its overall form (modulus and phase) as a function of the level.

Knowledge of the transfer function as a function of the level thus allows a simple, rapid and precise adjusting of the linearity of a transmission system. Adjustment of the modulus and of the phase of the transfer function is obtained when $S_d=0$ in the space $[0, |N_c|]$. The choice of those spectral lines of the measurement signal which are located at the two ends of the spectrum to be transmitted ensures that the second dimension of the signal $[F_1, F_2]$ is taken into account.

In fact, when linearity is obtained as a function of this measurement criterion, all the conventionally used criteria are satisfied.

The adjustment of the correction on the basis of this criterion therefore makes possible quality and rapidity, ensuring a time saving in both the formulation and quality monitoring, and a spectacular reduction in the number of measurement instruments required for these operations. Indeed, it suffices to bring together in one instrument the means required for measurement, that is to say in the particular case of television broadcasting:
a sawtooth video frequency signal generator,
two oscillators working at intermediate frequency which can be summed with the intermediate-frequency picture signal FI if necessary,
a simplified demodulator with a filter making it possible to gather the signal $S_d$ at the frequency $F_{IS}$ which is the difference in the two intermediate frequencies.

In the general case, the means used consists of a modulator making it possible to obtain a wave modulated by a low frequency, and a system for summing signals making it possible to add to the modulated wave two other signals constituting the signal for interrogating the linearity.

None of the means described requires high quality. It is their combination which allows a quality measurement.

The corresponding, very simple, low cost and compact instrument is particularly well suited to maintenance operations on site, the sites of the transmitters often being difficult to access. This measurement may even be used as criterion of the quality of a transmission system.

For this purpose, any nonlinearity must be manifested by a non-zero derivative $d\rho/dN$ and/or $d\phi/dN$, which shows up the signal $S_d$ at the intercarrier difference frequency ($F_{IS}$).

A linear amplifying system may naturally be linear that is to say all its elements are linear, or be linear by correction in a well-complemented system, that is to say in which a corrector amplifier is inserted in the system, its transfer characteristic compensating for the nonlinearity of the system.

In the case of power amplification the nonlinearity is due to the final stages. The complementary correction amplifier is located at the start of the system (precorrection).

Feasibility of the complementarity requires that the spectra of the signals processed by the two complementary amplifiers comply with the relative amplitudes of the various spectral lines of the spectrum, as well as their temporal coherence. Linearization therefore assumes that constant passbands have a constant group delay.

Figure 12:
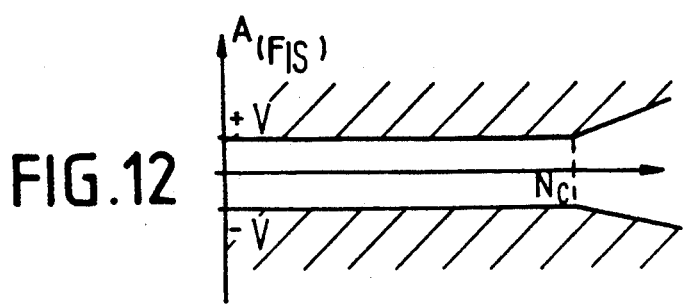
FIG. 12 illustrates an example of template with which a response characterizing good linearity may be in keeping.

A measure of linearity is therefore defined by the amplitude of the signal $S_d$ at the intercarrier difference frequency ($F_{IS}$) as a function of the level. It could be in keeping with a template thus defined between 0 and the peak level $N_c$, for example $+v$ and $-v$ as shown in FIG. 12. Thus, when the signal $S_d$ remains within the defined template, the amplifying system is regarded as linear. By contrast, if the signal $S_d$ leaves the template, a correction must be made.

In the general case, a measurement made on a transmitter is performed with the aid of the receiver. The quality of the transmitter is judged on the quality of the signals received. In this case it is difficult to allow for the lack of quality of the transmitter and of the receiver. Signals received which are of good quality do not prejudge the quality of the transmitter, a defect in the latter possibly compensating a defect in the receiver.

The proposed criterion makes it possible to readily allow for the one and the other. It is possible to use an unadjusted transmitter to generate the operator signal $S_{op}$, the interrogation signal being introduced only at the input of the receiver. Thus, any signal $S_d$ which appears at reception can then be ascribed only to the nonlinearity of the receiver alone The description of the measurement made in the context of a transmitter comprises a change of frequency in the amplifying system. This change of frequency is virtually inert or transparent in studying the linearity and a fortiori in the measurement method which is only more suited thereto in a system without change of frequency.

Thus, the linearity criterion for a transmission system is unique. Its implementation alone varies in accordance with the means available in the area in which it is used.

The transmission system is formulated or monitored by means of a signal defined by two dimensions which are
$[0, |N_c|]$ in amplitude/time space
$[F_1, F_2]$ in amplitude/frequency space Having performed this formulation and this monitoring, the two dimensions of the test signal become the two dimensions of the transmission system.

Any signal, which is then in keeping with this two-dimensional space within which the transmission system has been linearized, will be faithfully transmitted. In this way a transmission system of a television transmitter, formulated from an analog video frequency base signal, will be compatible with the use of a digital base signal, if this signal is in keeping with the dimensions of the system.

I claim:

1. A method for transmitting and receiving a signal with a maximum peak level $N_c$ having a frequency band ($F_1$, $F_2$), comprising the steps:
generating a composite signal having a first carrier frequency containing a picture signal and proximate to one end of the frequency band, modulated by an operator signal containing a sawtooth signal at a line frequency, said operator signal having a level varying between zero and a maximum peak level, and second and third carrier frequencies for carrying sound signals, proximate to the other end of the frequency band and separated from each other by a frequency which is equal to the intercarrier frequency;

transmitting the generated signal;

receiving the transmitted signal; demodulating the received signal;

analyzing the demodulated signal for nonlinearities by measuring the demodulated signal at the intercarrier frequency.

2. A method according to claim 1, further comprising the step:

correcting non-linearities in the transmitted signal by reducing an amplitude of the received signal at the intercarrier frequency.

* * * * *